United States Patent [19]

Dadd

[11] 4,230,571
[45] Oct. 28, 1980

[54] OZONE/ULTRAVIOLET WATER PURIFICATION

[76] Inventor: Robert C. Dadd, 1320 Sumac Cir., Concord, Calif. 94521

[21] Appl. No.: 5,429

[22] Filed: Jan. 22, 1979

[51] Int. Cl.² ............................................ C02B 3/08
[52] U.S. Cl. ................................. 210/760; 210/764; 422/24; 422/29
[58] Field of Search .................... 210/63 R, 63 Z, 64, 210/137, 192, 205, 220, 512 R, 175, 177; 250/527, 432 R, 435, 436, 437; 422/24, 28, 29

[56] References Cited

U.S. PATENT DOCUMENTS

| 854,965 | 5/1907 | Potter | 250/437 |
|---|---|---|---|
| 3,326,747 | 6/1967 | Ryan | 210/64 |
| 3,336,099 | 8/1967 | Czulak et al. | 210//63 Z |
| 3,674,216 | 7/1972 | Blair | 210/63 Z |
| 3,920,547 | 11/1975 | Garrison | 210/63 Z |
| 3,948,772 | 4/1976 | Ellner | 422/24 |
| 4,045,316 | 8/1977 | Legan | 250/527 |
| 4,141,830 | 2/1979 | Last | 210/63 Z |

FOREIGN PATENT DOCUMENTS

| 2327084 | 5/1973 | Fed. Rep. of Germany | 422/24 |
|---|---|---|---|
| 2307877 | 9/1974 | Fed. Rep. of Germany | 422/24 |
| 2620634 | 11/1977 | Fed. Rep. of Germany | 210/220 |
| 1295774 | 5/1962 | France | 422/24 |
| 5044648 | 4/1975 | Japan | 210/63 Z |

OTHER PUBLICATIONS

Evolution of the Ozone/UV Process for Waste Water Treatment, Prengle, presented at IOI/EPA Colloquium on Waste Water Treatment and Disinfection with Ozone at EPA/MERL, Cincinnati, OH, Sep. 15, 1977, Beginning-p. 49.

Primary Examiner—Ernest G. Therkorn

[57] ABSTRACT

A method and apparatus for the purification of water with ozone and ultraviolet radiation. Oxygen-containing gas, such as air, is directed to flow in a confined path past an untraviolet radiation source, such as a mercury vapor lamp. The absorption of ultraviolet radiation by oxygen produces ozone which is entrained in the flowing gas. The gas is next mixed with the contaminated water and the mixture of water and ozone is then directed past the same ultraviolet source in a path isolated from the confined path of gas alone. The ozone in the water acts directly to kill bacteria and viruses and to oxidize undersirable compounds in the water. The ultraviolet radiation also acts directly to kill bacteria and viruses in the water. Additionally the ultraviolet radiation acts as a catalyst for the disinfecting and oxidizing action of the ozone, so that water purification occurs much faster than would occur if the ozone were acting alone.

1 Claim, 4 Drawing Figures

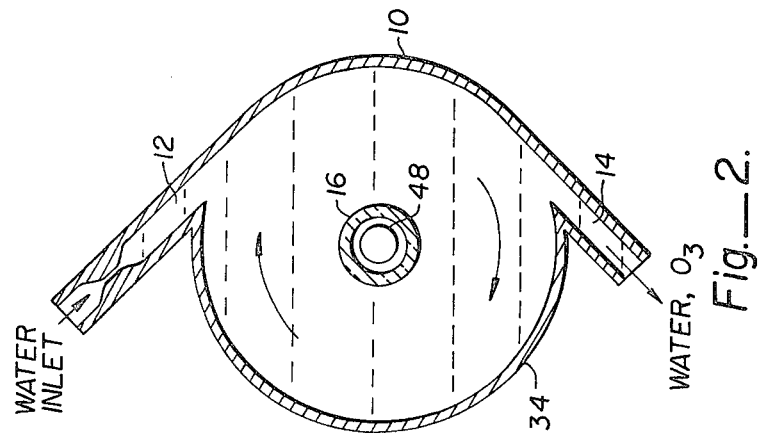
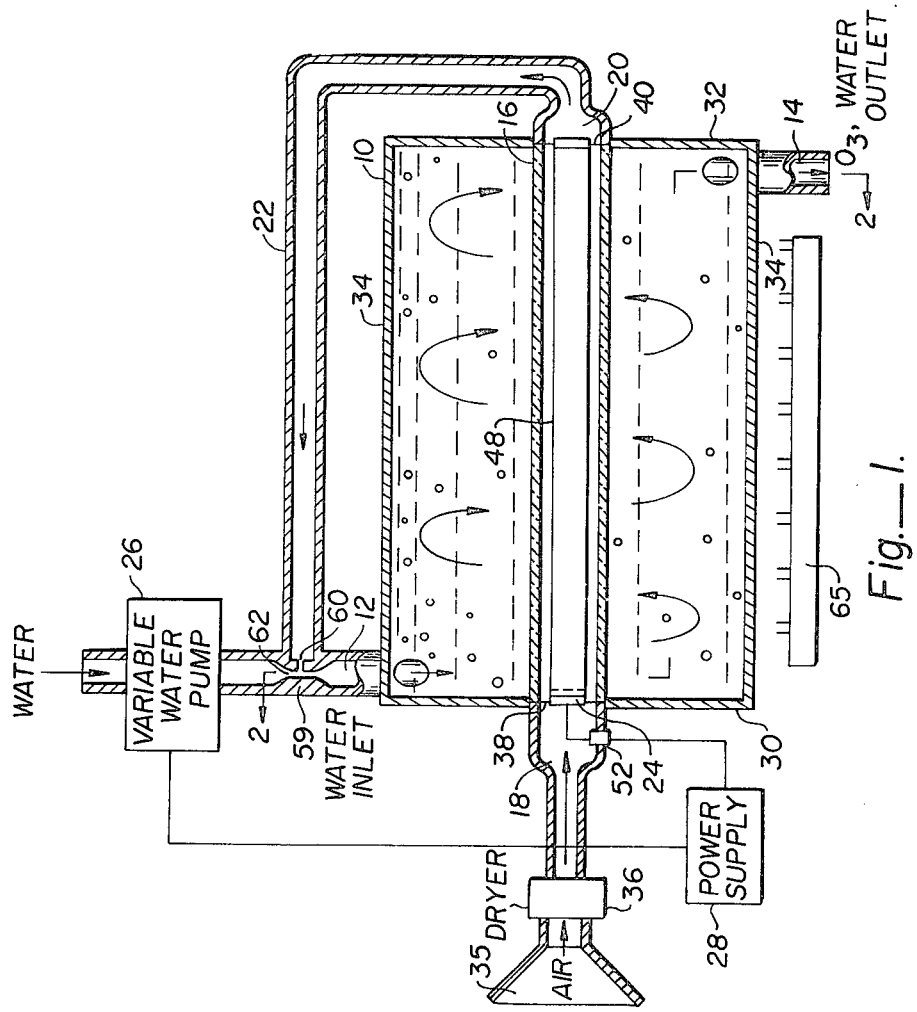

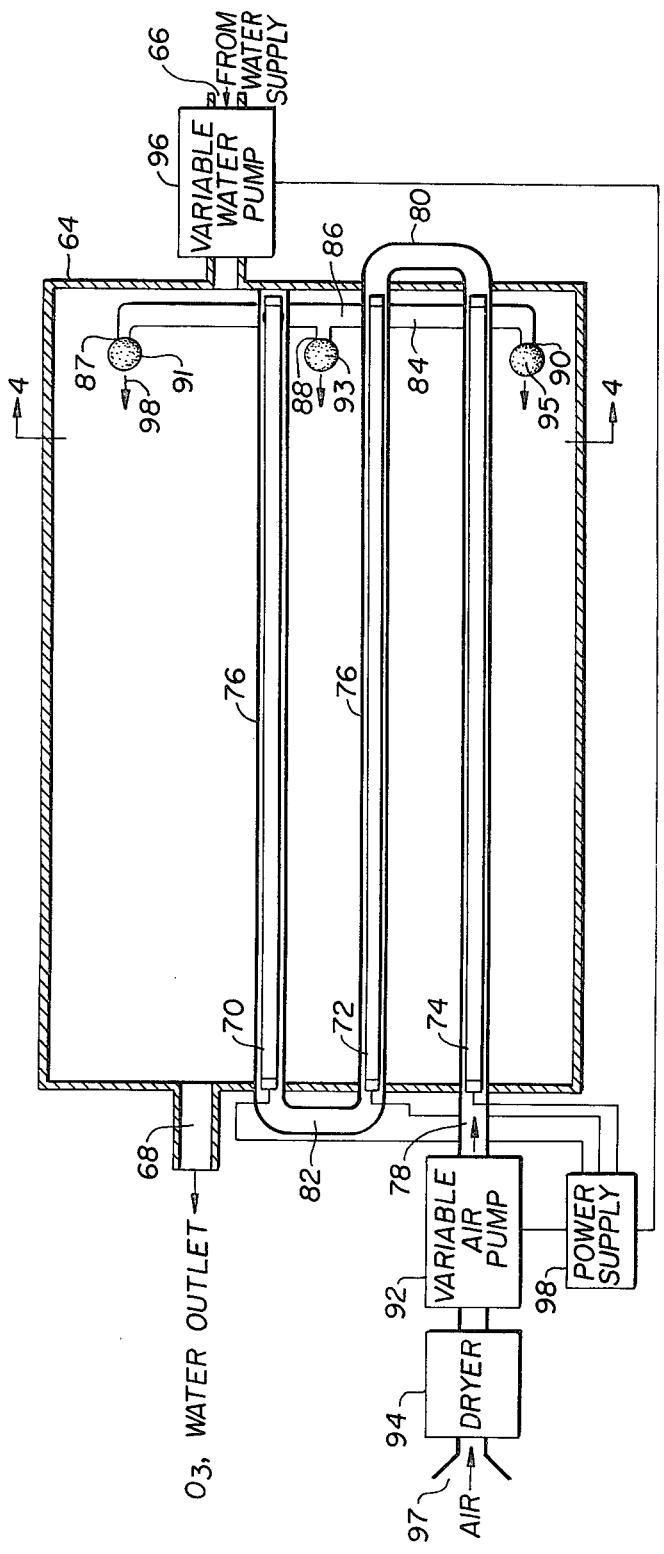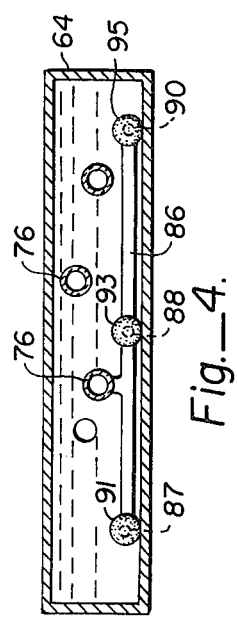
Fig._3.
Fig._4.

OZONE/ULTRAVIOLET WATER PURIFICATION

BACKGROUND OF THE INVENTION

This invention relates to a method and apparatus for the purification of water, and more specifically, to a method and apparatus utilizing ultraviolet radiation and ozone in combination to inactivate bacteria and certain viruses and to oxidize undersirable compounds in water.

The bactericidal effect of ultraviolet radiation is well-known. The absorption by living cells of ultraviolet radiation of a particular wave length has deleterious effects upon those cells, most notably the inhibition of cell division. In general, ultraviolet radiation of wavelengths in the neighborhood of 2,600 Angstroms has the greatest bactericidal effect.

The disinfecting action of ozone is also well-known and has been used to destroy bacteria and certain viruses in drinking water. Ozone also readily oxidizes many of the compounds which give contaminated water its bad odor and taste.

Ozone is most efficiently produced by subjecting ordinary oxygen to electrostatic discharge. Ozone is also produced less efficiently by subjecting ordinary oxygen to ultraviolet radiation. The absorption by ordinary oxygen of ultraviolet radiation of wavelengths in the neighborhood of 1,850 Angstroms results in the production of ozone.

The combination of the bactericidal effects of ozone and ultraviolet radiation have been utilized to purify liquids, including water. In most such applications an electric discharge is utilized to to produce ozone from ordinary oxygen. The substance to be purified, e.g., water, is passed in the vicinity of an ultraviolet radiation source during which the ultraviolet radiation, restricted to a relatively narrow wavelength range, inactivates bacteria and certain viruses in the liquid. The ozone produced by the ozone generator is then subsequently introduced to the liquid after it has been subjected to the ultraviolet radiation to further inactivate any residual bacteria or viruses.

The above-described method of utilizing both ultraviolet radiation and ozone to purify water has never become commercially feasible, at least for general consumer applications such as swimming pools and potable water supplies, because the requirement of a separate electric-discharge ozone generator and an ultraviolet radiation source renders this method cost prohibitive.

In U.S. Pat. No. 3,336,099, water is passed through a first chamber surrounding an ultraviolet radiation source, and oxygen is passed through a second chamber near the ultraviolet radiation source to produce ozone. The previously irradiated water and the ozone are then mixed together in a third chamber where the ozone acts upon residual bacteria and viruses not destroyed by the ultraviolet radiation.

A recent technique for the removal of cyanides in water involves introducing ozone to the water to be purified while simultaneously irradiating the ozone and water mixture with ultraviolet radiation. Such a technique takes advantage of a catalytic effect of the ultraviolet radiation upon the reaction of ozone wih undesirable substances in the water, such as cyanides. The ultraviolet radiation thus increases the reaction rate of the ozone upon these undesirable compounds over the rate which could be achieved absent the ultraviolet radiation. This technique, as disclosed in U.S. Pat. No. 3,920,547, utilizes a separate electric discharge type of ozone generator to produce ozone. The ozone produced is introduced into the water after which the ozone and water mixture is subjected to the ultraviolet radiation. This form of simultaneous application of ozone and ultraviolet radiation, each of which alone is a strong disinfectant, has also been shown to kill bacteria much faster and at much lower dosages than either ozone or ultraviolet radiation alone. See Prengle, H. William, "Evolution of the Ozone/UV Process For Wastewater Treatment", paper presented at the IOI/EPA colloquium on Wastewater Treatment and Disinfection with Ozone held in Cincinnati, Ohio, Sept. 15, 1977.

SUMMARY OF THE INVENTION

The present invention provides a method and apparatus for the purification of water in which an ultraviolet radiation source simultaneously produces ozone, irradiates the water, and irradiates the subsequent mixture of water and ozone, thereby combining the bactericidal and oxidizing effects of ozone, the bactericidal effect of ultraviolet radiation, and the catalytic effect of ultraviolet radiation on the reaction of ozone with bacteria, viruses and undersirable compounds in the water.

Broadly, the invention involves generating ultraviolet radiation through a relatively broad spectrum, directing an oxygen-containing gas in a relatively confined path in close proximity to the ultraviolet radiation source so as to produce ozone, redirecting the ozone-containing gas to the water to be purified, and directing the mixture of water and ozone-containing gas through a path isolated from the confined path of gas but yet in close proximity to the same ultraviolet radiation source so that the mixture is subjected to ultraviolet radiation.

In accordance with the present invention, ultraviolet radiation in the wavelength range of 1,850 Angstroms is absorbed by the oxygen traveling through the confined path in close proximity to the ultraviolet source. This absorption of ultraviolet radiation by oxygen in the moving gas produces ozone.

Simultaneously, ultraviolet radiation in the wavelength range of 2,600 Angstroms passes through the moving gas, through an ultraviolet radiation permeable material confining the path of gas, and into the water flowing in the isolated path. Radiation in this wavelength range has a bactericidal effect upon bacteria and other viruses present in the flowing water.

The ozone-containing gas exits the confined path and is redirected to the water just prior to the passage of the water through the radiation. Thus, as the mixture of ozone-containing gas and water passes through the radiation, the ultraviolet radiation has a catalytic effect on the reaction of ozone with bacteria, viruses, and undersirable compounds in the water.

In one embodiment of the present invention, a tank having a water inlet and a water outlet is provided. Located within the tank is an ultraviolet radiation source, e.g., a mercury vapor ultraviolet tube extending generally the length of the tank. A conduit of ultraviolet radiation permeable material surrounds the ultraviolet tube, and confines the ultraviolet tube from the interior of the tank. The conduit provides a passage for the oxygen-containing gas and has an entrance and an exit, each communicating with the tank exterior. A pipe or other fluid communication means interconnects the conduit exit with the water inlet of the tank.

The water to be purified is introduced into the tank through the water inlet. Simultaneously, an oxygen-containing gas, e.g., air, is introduced through the entrance of the conduit, passes in close proximity to the source of ultraviolet radiation and through the radiation generated by the ultraviolet source. Ozone is produced and entrained in the oxygen-containing gas and redirected to the water inlet where it is mixed with the water entering the tank. Thus the mixture of water and ozone-containing gas passes into the tank and through radiation emanating from the same ultraviolet radiation source which produced the ozone. The radiation acting upon the mixture of ozone and water passes through the ultraviolet radiation permeable conduit into the mixture in the tank, where it has the dual effect of acting as a bactericide on bacteria and viruses in the water and as a catalyst on the reaction of ozone with bacteria, viruses, and undesirable compounds in the water. The mixture of ozone and water passes out the water outlet of the tank and into a water supply, e.g., a swimming pool.

Thus, the present invention provides for an efficient and cost-effective method and apparatus for purifying water, with special application to general consumer use, such as for home swimming pools and potable water supplies.

For a fuller understanding of the nature and advantages of the invention, reference should be made to the ensuing detailed description taken in conjunction with the accompanying drawings.

BRIEF DESCRIPTION OF THE DRAWINGS

FIG. 1 is a side sectional view of one embodiment of the invention.

FIG. 2 is a view of section 2—2 of FIG. 1.

FIG. 3 is a top sectional view of a second embodiment of the invention.

FIG. 4 is a view of section 4—4 of FIG. 3.

DESCRIPTION OF THE PREFERRED EMBODIMENTS

Referring first to FIG. 1, one embodiment of the present invention comprises generally a tank 10 having a water inlet 12 and a water outlet 14, a conduit 16 located within the tank having an entrance 18 and an exit 20, means providing fluid communication between conduit 16 and tank inlet 12, such as pipe 22, an ultraviolet radiation source, such as ultraviolet lamp 24 located within conduit 16 and sealed from the interior of tank 10, a water pump 26, and a power supply 28 providing electrical power to ultraviolet lamp 24 and water pump 26.

As illustrated in FIGS. 1 and 2, tank 10 has a generally cylindrical shape defined by outer wall 34, and has water inlet 12 and outlet 14 oriented tangentially to and at opposite ends of cylindrical tank 10. Conduit 16, which is constructed of any suitable ultraviolet radiation permeable material, such as quartz glass, has a generally cylindrical shape and is aligned with the central longitudinal axis of cylindrical tank 10. Conduit 16 passes through both end walls 30, 32 of tank 10 and has an entrance 18 and exit 20 each communicating with the exterior of tank 10. Thus, conduit 16, together with circular end walls 30, 32 and cylindrical wall 34 of tank 10 defines a generally annular shaped tank interior.

Entrance 18 of conduit 16 receives ambient air through air inlet 35. An air dryer 36, the operation of which will be more fully described below, is located between air inlet 35 and the entrance 18 of conduit 16. Located near the junction of pipe 22 and water inlet 12 is a venturi "pump," 59.

Located within conduit 16 and extending generally the length of conduit 16 is an ultraviolet radiation source, such as ultraviolet lamp 24. Lamp 24 is preferably a mercury vapor lamp having a sealed quartz glass tube 48 and generates ultraviolet radiation through a relatively broad spectrum. Lamp 24 is suspended generally along the central axis of conduit 16 by suitable radially directed brackets 38, 40 which support the ends of lamp 24 and secure them to tank end walls 30, 32, respectively. Brackets 38, 40 preferably comprise radially directed ribs (not shown) so that air may pass freely from the tank exterior, through conduit 16, and into pipe 22.

Electrical power is provided to ultraviolet lamp 24 in conduit 16 from power supply 28 through a plug 52 near entrance 18. Plug 52 prevents the escape of air from conduit 16.

Water from an external water supply (not shown), such as a swimming pool, is directed to water inlet 12 by variable pump 26, which may be a conventional displacement fluid pump. Pump 26 is electrically coupled to power supply 28.

The embodiment depicted in FIGS. 1 and 2 may be more fully understood by considering the function of the above-described component parts during operation of the apparatus to purify water.

In operation, water pump 26, driven by current from power supply 28, pumps the water to be purified from an external water supply (not shown) through tank inlet 12 and into the interior of tank 10. Because of the tangential orientation of tank inlet 12 relative to cylindrical wall 34 of tank 10, the entering water travels in an initially circumferential path around the interior of tank 10, and then in a generally helical path in the annular shaped tank interior toward tangentially oriented water outlet 14. The direction of flow of water in this manner is depicted by arrows in FIGS. 1 and 2.

Proximate the interconnection of pipe 22 with water inlet 12 is a venturi 59 having an orifice 60 located near the throat 62. Orifice 60 provides fluid communication between water inlet 12 and pipe 22. Because of the reduction in static fluid pressure at the throat 62 of venturi 59, a sub-atmospheric condition exists at orifice 60. Thus, the water flowing through venturi 59 "pulls" ambient air in through air inlet 35 into entrance 18 of conduit 16 and between the ultraviolet radiation permeable wall of conduit 16 and glass tube 48 of ultraviolet lamp 24, out conduit exit 20, through pipe 22, through orifice 60, and into throat 62 of venturi 59. Thus, at venturi 59 the water and air are mixed prior to the entrance of the water into the interior of tank 10.

Simultaneously with the introduction of water from the water supply (not shown) by means of water pump 26, power supply 28 provides electric current to ultraviolet lamp 24. Thus, ultraviolet radiation emitted from ultraviolet lamp 24 passes through the interior of conduit 16, through the ultraviolet radiation permeable wall of conduit 16, and into the interior of tank 10.

The gas drawn in through inlet 35 is preferably air, but may be any suitable oxygen-containing gas. The air passes through dryer 36, which contains a dessicant to remove water vapor, and into conduit 16 where it is exposed to ultraviolet radiation in the wavelength range of 1,850 Angstroms. The absorption by oxygen of ultraviolet radiation in this particular wave-length range results in the production of ozone. The ozone produced within conduit 16 is entrained in the flowing gas stream and passes out conduit exit 20 into pipe 22, through venturi 59, and ultimately into water inlet 12, where it is mixed with the water entering tank 10.

The mixture of water, ozone and air thus enters tank 10 at water inlet 12. The mixing of water and ozone within tank 10 is enhanced by the helically shaped path through which the mixture of ozone and water is forced to travel. During passage through the interior of tank 10, the mixture is exposed to ultraviolet radiation from ultraviolet lamp 24. Because of the extended helical path, the residence time of the mixture within the tank, and thus the duration of exposure of the mixture to the ultraviolet radiation is increased. Radiation in the wavelength range of 2,600 Angstroms passes through the radiation permeable wall of conduit 16 and into the interior of tank 10. Ultraviolet radiation in this particular wavelength acts as a bactericide upon bacteria and viruses present in the water. Additionally, the ozone present in the water destroys bacteria and viruses and oxidizes undesirable chemical compounds which may be present in the water. Furthermore, the reaction of ozone with the bacteria, viruses and undesirable compounds present in the water is facilitated by the simultaneous action of the ultraviolet radiation generated by ultraviolet lamp 24. Thus, the water traveling through the interior of tank 10 is subjected to both ozone and ultraviolet radiation.

The ozone which is first mixed in the water in tank 10 at venturi 59 is produced by radiation in one wavelength range from an ultraviolet radiation source which simultaneously emits radiation in a different wavelength range, the latter radiation passing into the water in tank 10. Thus, the water exiting tank outlet 14 has been subjected to the direct effect of ultraviolet radiation, the direct effect of ozone, and the catalytic effect of ultraviolet radiation upon the reaction of ozone with bacteria, viruses and undesirable compounds in the water. The mixture of water and ozone exits tank outlet 14 and is directed back to the water supply (not shown) if, for example, the water supply (not shown) is a conventional swimming pool. The bactericidal and oxidizing effects of the ozone upon contaminants in the water will continue for some time in the water supply.

The use of variable water pump 26 permits both the residence time of the mixture of ozone and water within tank 10 and the gas flowing through conduit 16 to be varied. Thus, the optimum speed of pump 26 may be selected to purify water of varying degrees of contamination.

Additionally, it may be desirable to supply heat to tank 10, as depicted by heater 65 in FIG. 1., to further increase the rate of reaction of ozone upon bacteria, viruses and undesirable compounds present in the water.

As should now be apparent, the present invention provides a low-cost and efficient water purification device. The provision of a single ultraviolet radiation source and the utilization of a confined path for the oxygen-containing gas and an isolated path for the subsequent mixture of water and ozone, whereby both paths are subjected simultaneously to the effects of ultraviolet radiation in different wavelength ranges, permits the purification of water in an efficient and cost-effective manner. Additionally, the utilization of a venturi pump to draw in air allows for the use of only a single pump, e.g. variable water pump 26, to force both water and air through the device. Energy consumption is thereby minimized, thus allowing application of the invention to the home consumer market, such as for the purification of water in home swimming pools.

Referring now to FIGS. 3 and 4, an alternative embodiment of the present invention is illustrated. Tank 64 has a generally rectangular configuration and has a water inlet 66 and water outlet 68. Separate ultraviolet radiation lamps 70, 72, 74 are oriented parallel to the length of tank 64 and generally parallel to the direction of water flow from inlet 66 to outlet 68. Each of the lamps 70, 72, 74 is preferably a mercury-vapor ultraviolet lamp having a sealed quartz tube.

A conduit 76 seals each of the lamps from the interior of tank 64. Conduit 76 has an entrance 78 and segments 80, 82 located outside the tank, and provides a continuous path for the air past all of the lamps 70, 72, 74. A lower portion 86 of conduit 76 extends across the width of tank 64 and has exits 87, 88, 90 spaced across the width of tank 64. Each of the exits 87, 88, 90 is connected to a sparger 91, 93, 95, respectively, which forces the air out into the water in tank 64 in extremely small bubbles, thereby enhancing mixture of the ozone with the water.

A variable air pump 92 and an air dryer 94 are located between conduit entrance 78 and the ambient air inlet 97. Thus, the path of air in conduit 76 is from air inlet 97, through dryer 94, air pump 92, past lamp 74 through conduit segment 80, past lamp 72, through conduit segment 82, past lamp 70, into lower portion 86, and out exits 87, 88, 90 and spargers 91, 93, 95, respectively.

Water is directed through water inlet 66 from the water supply (not shown) by variable water pump 96, such as a positive displacement pump, which forces water into tank 64 and ultimately out water outlet 68.

In operation, both air pump 92 and water pump receive electric current from power supply 98. Thus, air passes through conduit 76 simultaneously with the passage of water through the interior of tank 64. The air passes through the above-described path confined by conduit 76 and is thus subjected to ultraviolet radiation from all three of the ultraviolet lamps 70, 72, 74. During passage in this confined path, the oxygen present in the air absorbs ultraviolet radiation in the wave-length range of 1,850 Angstroms, thereby producing ozone which is entrained in the air passing through the confined path. Ultimately the ozone and air pass out conduit exits 87, 88, 90 which are located within the interior of tank 64 near the water inlet 66. Thus, immediately upon the entrance of water from water inlet 66 into tank 64, ozone from exits 87, 88, 90 is sprayed from spargers 91, 93, and 95 and is mixed with the entering water. The mixture of ozone and water moves parallel to the lamps toward the opposite end of tank 64 and toward water outlet 68.

During the passage of water through tank 64, the ozone intermixed with the water reacts with bacteria, viruses and undesirable compounds to inhibit the growth of organisms and oxidize undesirable compounds. Simultaneously, the mixture of ozone and water is subjected to ultraviolet radiation from lamps 70, 72, 74 which passes through the ultraviolet radiation permeable wall of conduit 76. This ultraviolet radiation, generally in the wave-length range of 2,600 Angstroms, acts directly upon bacteria, viruses and undesirable compounds in the water. Furthermore, this ultraviolet radiation increases the reaction rate of the ozone upon bacteria, viruses and undesirable compounds.

The embodiment depicted in FIGS. 3 and 4, which includes three separate ultraviolet lamps, generally produces a greater amount of ozone that that produced by the embodiment shown in FIGS. 1 and 2 because of the increased exposure of the ambient air to the ultraviolet radiation. The residence time of the air passing through conduit 76 may be varied by changing the speed of variable air pump 92, so that the optimum amount of ozone is produced. Simultaneously, the flow rate of water through tank 64 may be varied to an optimum rate by means of variable water pump 96. Thus, depending upon the contamination of the water to be purified, various amounts of ozone and various dossages of radiation may be selected.

While the preferred embodiments of the present invention have been illustrated in detail, it should be apparent that modifications and adaptations of those embodiments will occur to those skilled in the art. However, it is to be expressly understood that such modifications and adaptations are within the sphere and scope of the present invention as set forth in the following claims.

What is claimed is:

1. A method of purifying water which comprises the steps of:
    generating relatively broad spectrum ultraviolet radiation;
    directing air in a generally confined path through the radiation so as to produce ozone in the air;
    introducing the ozone-containing air into the water to be purified; and
    directing the mixture of water and ozone-containing air through the radiation in a generally helical path around the source of radiation so as to extend the path length and thereby the duration of exposure of the mixture to the radiation, said generally helical path being outside of and isolated from the confined air path while the air is being simultaneously directed through the radiation.

* * * * *